May 14, 1935.  E. A. FREED  2,001,383
SELF ALIGNING BEARING
Filed June 2, 1934
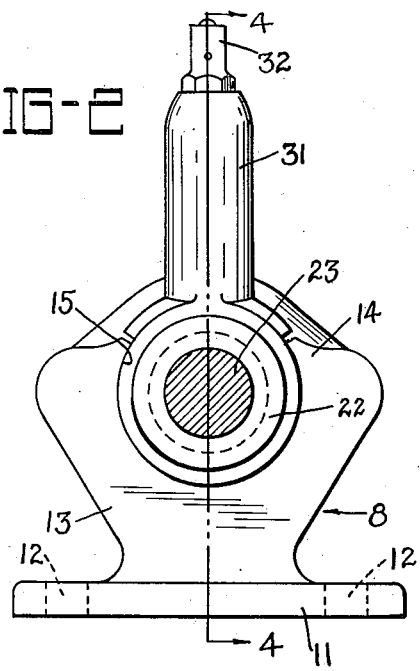
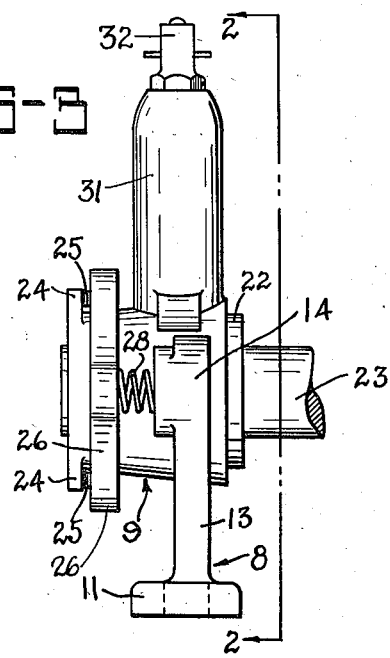
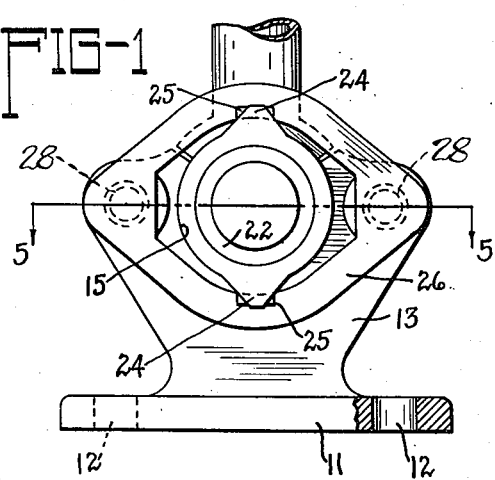
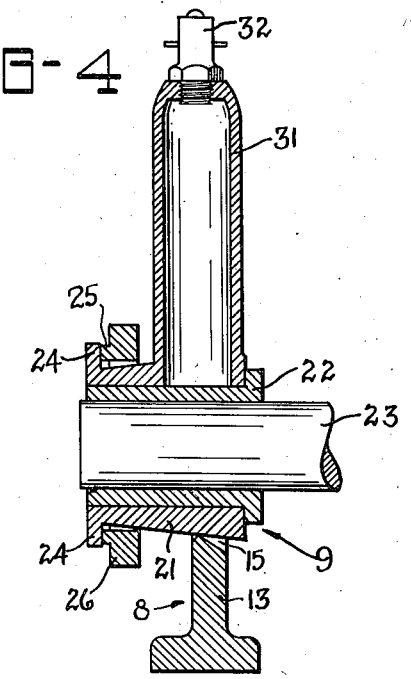
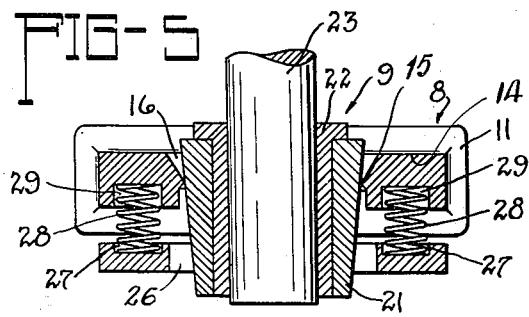
INVENTOR
Edward A. Freed Patented May 14, 1935

2,001,383

UNITED STATES PATENT OFFICE 2,001,383

SELF-ALIGNING BEARING

Edward A. Freed, Moline, Ill.

Application June 2, 1934, Serial No. 728,742

5 Claims. (Cl. 308—72)

My present invention relates to shaft bearings and particularly to the self aligning type, in which the bearing sleeve is formed separate from the rest of the structure and is supported in such a manner that the sleeve of one bearing is automatically adjusted by the shaft, into alignment with the sleeve of the opposite bearing.

The principal object of my invention is to provide a self aligning bearing of this kind in which the bearing sleeve is easily adjusted into the aligned position, and firmly supported in any position in which it is adjusted.

A further object is to provide a bearing structure of this nature which is economical to manufacture, efficient in operation, and strong and otherwise adapted for the purpose for which it is intended.

Other objects and advantages of my invention will be apparent to those skilled in the art after a consideration of the following detailed description, taken in conjunction with the accompany drawing, wherein:

Figure 1 is an elevational view of the outer side of the bearing structure;

Figure 2 is an elevational view of the inner side of the bearing taken substantially on the plane of line 2—2 of Figure 3;

Figure 3 is a side elevational view;

Figure 4 is a longitudinal sectional view taken on the plane of line 4—4 of Figure 2; and, Figure 5 is a sectional view taken on the plane of line 5—5 of Figure 1.

The bearing structure includes a supporting bracket 8 and a bearing sleeve 9. The bracket 8 comprises a base member 11 which is adapted to be secured in place by bolts or similar securing means which are projected thru holes 12 provided in member 11. A vertical web or flange 13 is formed integral with base member 11 and extends upwardly therefrom diverging into a yoke 14 having an arcuate bearing portion 15. The bearing portion 15 is beveled on the inner side as shown at 16 in Figure 5, for a purpose to be later described.

The bearing sleeve 9 comprises a cylindrical member 21, the outer surface of which is tapered. A longitudinal opening is provided thru member 21 to receive a bearing bushing 22, preferably of the "oilite" type or similar construction which is adapted to journally support a shaft 23. A pair of vertically diametrically opposed lugs 24 are formed on the smaller end of member 21 and engage against cam portions 25 formed on a retaining ring 26.

The ring 26 is substantially diamond shaped having an opening of similar formation, and an aperture 27 is provided adjacent each end thereof to receive compression springs 28 which also project into similar apertures 29 formed in yoke 14 opposite the apertures 27. The ring 26 is disposed around sleeve member 21 between the lugs 24 and yoke 14 and is yieldably held against lugs 24 by the springs 28. The ring 26 pressing against lugs 24 urges bearing sleeve 9 outwardly until the tapered outer surface of member 21 comes into engagement with the arcuate bearing portion 15 of yoke 14. The bearing sleeve 9 is adjusted in any direction, to align with the bearing sleeve of the opposite bearing structure, by shaft 23. The sleeve 9 is adjusted against the tension of springs 28 which hold the member 21 in engagement with arcuate portion 15 of yoke 14 in any adjustment of sleeve 9.

A lubricant reservoir 31 comprising a tube-like receptacle is formed on the upper side of member 21 and extends upwardly therefrom. A lubricant is forced into reservoir 31 with an alemite grease gun thru an alemite fitting 32 fixed in the top of reservoir 31. The structure of the "oilite" bushing 22 is of a porous nature and the lubricant passes thru the bushing in an even manner supplying a film of oil between the bushing 22 and shaft 23.

In assembling the bearing structure, the sleeve 9 is extended outwardly thru yoke 14 until the tapered surface of member 21 engages the arcuate bearing portion 15 of yoke 14. The retaining ring 26 is then slipped over the end of member 21 in a vertical manner, that is, so that the ends of ring 26 are in vertical alignment with the lugs 24. After ring 26 has been advanced beyond lugs 24 it is rotated a quater turn in either direction so that the cam portions 25 come into engagement with lugs 24 and the springs 28 which are projecting outwardly from apertures 29 engage in the apertures 27 in the retaining ring 26. When springs 28 are seated in the apertures 27 and 29, they serve as locking elements to prevent the retaining ring 26 from rotating in either direction, thereby locking the bracket 8 and bearing sleeve 9 in assembled relation. To remove bearing sleeve 9 from bracket 8, springs 28 are removed from either of the apertures 27 or 29 by forcing a pointed tool or key behind the end of spring 28 and exerting a prying force thereon. After one end of each of the springs 28 has been removed from the adjacent aperture the ring 26 may be rotated a quater turn and drawn over the end of member 21 thereby unlocking sleeve 9 from bracket 8 to permit removal thereof. The bearing sleeve 9 of one bearing structure is adjusted into axial alignment with the sleeve of the opposite bearing structure by shaft 23 passing thru both sleeves. The bevel 16 on the inner side of yoke 14 provides clearance for the large end of cylindrical member 21 to swing into any adjustment of the bearing sleeve 9, thereby permitting the sleeve to be easily adjusted into proper alignment by the shaft 23. In any adjusted position of sleeve 9, member 21 is held in contact with the arcuate bearing portion 15 by the springs 28, which are constantly urging sleeve 9 outwardly.

Although I have described a specific form of this invention in more or less detail, it will be apparent that various additions, omissions and substitutions can be made therein without departing from the spirit of this invention or the scope of the appended claims.

What I claim, therefore, and desire to secure by Letters Patent is:

1. A self aligning bearing comprising a supporting bracket, a yoke formed on said bracket, a beveled surface around the edge of said yoke on one face thereof, a tapered bearing sleeve supported in said yoke and engaging said beveled surface, and resilient connecting means between said sleeve and said yoke, whereby said sleeve is held in yielding engagement with said yoke in any position in which said sleeve is adjusted relative to said yoke.

2. A self aligning bearing comprising a supporting bracket, a yoke formed on said bracket, a beveled surface around the edge of said yoke on one face thereof, a tapered bearing sleeve supported in said yoke and engaging said beveled surface, a pair of diametrically disposed lugs projecting from said sleeve adjacent the smaller end thereof, a retaining ring disposed around said sleeve between said yoke and said lugs and contacting with said lugs, and resilient means between said yoke and said retaining ring, whereby said sleeve is held in yielding engagement with said yoke in any position in which said sleeve is adjusted relative to said yoke.

3. A self aligning bearing, comprising a supporting member, an opening in said supporting member, a beveled surface around said opening, a bearing sleeve supported in said opening, and resilient connecting means disposed between and engaging with said bearing sleeve and said supporting member, whereby said bearing sleeve is held in yielding engagement with said supporting member in any position in which said sleeve is adjusted relative to said supporting member.

4. A self aligning bearing comprising a supporting bracket, a yoke formed on said bracket, a beveled surface around the edge of said yoke on one face thereof, a bearing sleeve supported by said yoke and engaging said beveled surface, and resilient connecting means between said sleeve and said yoke, whereby said sleeve is held in yielding engagement with said yoke in any position in which said sleeve is adjusted relative to said yoke.

5. A self aligning bearing comprising a supporting bracket, a yoke member formed on said bracket, a bearing member supported by said yoke, a beveled surface around the edge of one of said members, and resilient means disposed between and connecting with said yoke member and said bearing member, whereby said bearing member is held in yielding engagement with said yoke member in any position in which said bearing member is adjusted relative to said yoke.

EDWARD A. FREED.